Oct. 9, 1928.  
H. A. SILVEN  
1,687,398  
SIGNALING DEVICE FOR CROSS FEED MECHANISMS  
Filed April 19, 1923  
2 Sheets-Sheet 2

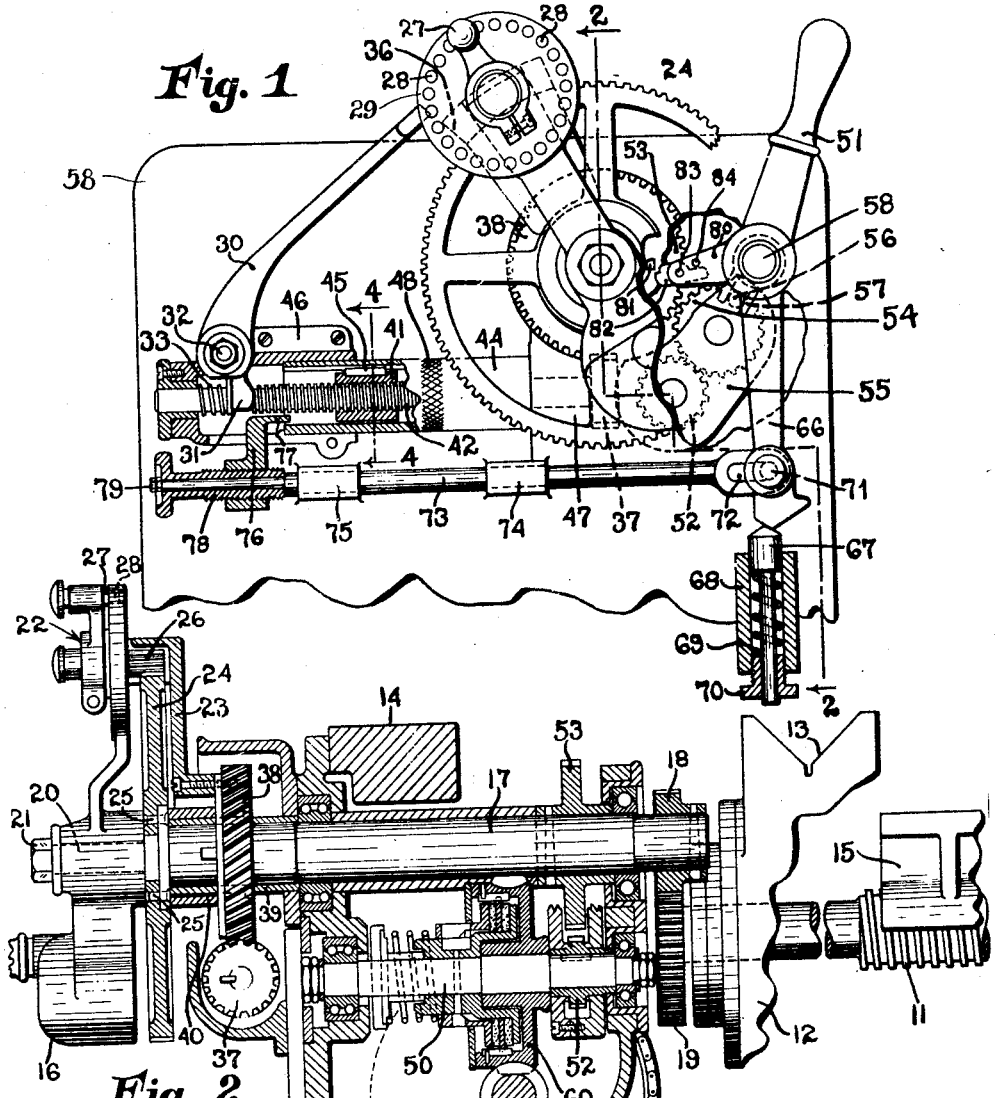

Witness  
Harold W. Eaton

Inventor  
Herbert A. Silven  
By Clayton L. Jenks  
Attorney

Patented Oct. 9, 1928.

1,687,398

UNITED STATES PATENT OFFICE.

HERBERT A. SILVEN, OF WORCESTER, MASSACHUSETTS, ASSIGNOR TO NORTON COMPANY, OF WORCESTER, MASSACHUSETTS, A CORPORATION OF MASSACHUSETTS.

SIGNALING DEVICE FOR CROSS-FEED MECHANISMS.

Application filed April 19, 1923. Serial No. 633,183.

My invention relates to a cross feed mechanism for machine tools and more particularly to an improvement over the grinding machine mechanism shown in the patent to C. H. Norton, No. 1,416,054 of May 16, 1922.

In grinding certain work, such as the pins of crankshafts, it is necessary to turn the cross feed wheel of a grinding machine a comparatively large number of revolutions, due to the usual geared-down connection of the feed screw to the feed wheel, in order to remove the grinding wheel from the work a sufficient distance to allow the calipering of the work or the positioning of the table for grinding another pin. Since the successive pins of a crankshaft are ground to the same diameter, it is desirable in this kind of work to have a positive stop embodied in the cross feed construction so that work can be rapidly and conveniently duplicated. A more complete disclosure of this type of stop mechanism is given in the above-mentioned patent to Norton. In order to grind duplicate pieces rapidly, it is also desirable that the wheel be brought quickly to position for grinding and that it thereafter be moved with precision, and preferably by a slow feed power mechanism, without unnecessary attention on the part of the operator.

Heretofore the cross feed in such machines has been operated by hand to remove the wheel from the work and return it to an initial grinding position, after which a power feed may be manually connected to feed the wheel during grinding. It has been necessary for the operator to keep a mental account of the number of revolutions of the feed wheel in moving the grinding wheel rearwardly for positioning new work and then moving it forward to its initial grinding position. In bringing the grinding wheel up to the work, the operator turns the hand wheel rapidly and there is great danger of a mistake being made in the count and thereby forcing the grinding wheel abruptly into the work to the detriment of both the work and the grinding wheel. This necessity for careful attention being given to the step of bringing the wheel up to the work has been a material handicap to the operator in his attempt to obtain rapid production.

It is, therefore, an object of my invention to overcome such difficulties and to provide a cross feed mechanism which may be adjusted to prevent the operator forcing the grinding wheel abruptly into the work and which automatically throws in the power feed when the grinding wheel has nearly reached its initial grinding position.

In grinding such articles as crankshafts, a hand feed has been employed for the grinding wheel, but this is undesirable as a uniform feed of the wheel is not obtained and there is, consequently, an uneven wear upon the grinding wheel which requires frequent truing. This operation of truing the wheel is expensive particularly where hard wheels are employed, such as used in grinding cranks, as there is large wear upon the diamond.

Another object of my invention is, therefore, to provide an automatic feed controlling mechanism, which permits a rapid movement of the tool when distant from the work, but automatically limits the rate at which the tool may be fed forward when a predetermined position has been reached so that the tool may not thereafter be moved, either by hand or by power at a rate faster than it can be safely and efficiently fed into the work.

It is a further object to provide a cross feed mechanism in which the power feed may be automatically thrown into operation when the tool reaches a predetermined point just before contacting with the work and which automatically stops the feed when a predetermined movement of the wheel slide has taken place.

A still further object is to provide means whereby the power feed may be automatically thrown out when the feed wheel is rotated in the reverse direction to remove the wheel from the work thus permitting a rapid movement of the feed mechanism by hand.

With these and further objects, as will be apparent in the following disclosure, my invention resides in the combination of parts set forth in the specification and covered by the claims appended hereto.

In the drawings in which like numerals represent like parts:

Fig. 1 is a front elevation of my improved cross-feed mechanism, parts being broken away to more clearly show the construction;

Fig. 2 is a vertical transverse section therethrough, approximately on the line 22 of Fig. 1, showing a part of the base in section and part of the feed screw and half nut engaging it broken away;

Figure 5:
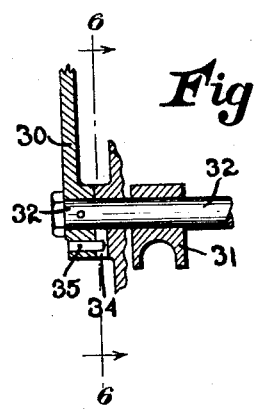
Fig. 5 is a sectional detail showing the means for limiting the movement of the stop lever.

In accordance with my invention I propose to provide a micrometer cross feed mechanism for machine tools, and particularly for a grinding machine wheel slide, which may be operated to move the slide in either direction by hand and which is so arranged that when the slide has been moved by hand towards the work to a predetermined point, a power feed mechanism is automatically connected with the wheel slide to move the same in a forward direction during the remainder of the operation upon the work. I furthermore propose to combine such a mechanism with the device shown in the prior Norton patent, so that after the work and cutting tool have been brought by hand almost into cutting engagement and the power feed clutch mechanism has been engaged to cause further relative movement of the work and tool, then the power feed is permitted to operate the cross feed screw at a uniform rate until a further predetermined point has been reached at which point a stopping device is brought into play to stop the slide. This power feed mechanism is so arranged that it may be automatically disconnected from engagement with the cross feed screw upon manually rotating the latter in the reverse direction to separate the work and grinding wheel.

My preferred arrangement comprises a member which is moved in timed relationship with the cross feed screw and is adapted to actuate a load and fire operated clutch mechanism to connect the power drive with the cross feed screw and then upon further movement of said member to cause a stop to be drawn into the path of an abutment on a movable portion of the cross feed mechanism. In order to combine these various operating devices into a single compact mechanism, I prefer to employ the rotatable nut shown in the prior patent, which is longitudinally moved by a screw geared to a cross feed screw. This nut is adapted to engage a finger which is arranged to operate a load and fire operated clutch mechanism to throw in the power feed and thereafter to engage the stop lever shown in the prior patent and move it into the path of an abutment on the hand wheel which is employed to rotate the cross feed screw.

In the specific embodiment of my invention selected for illustration, I have shown the usual cross-feed screw 11, mounted in the base 12 of a grinding machine. The base is provided with the usual V-way 13 and flat way 14, on which the work table (not shown) slides longitudinally, and the cross feed screw meshes with the usual half nut 15, which is connected to the wheel slide (not shown) mounted to slide transversely of base.

The manually operable micrometer mechanism for rotating the cross feed screw comprises a reduction gearing connected to the screw which is rotated precisely by means of a crank arm connected to the gearing through an adjustable precision device arranged to permit a fine adjustment of the stopping position of the wheel slide. The crank arm 16, as illustrated, is located on the front of the machine and connected to the shaft 17, this shaft driving through reduction gears 18 and 19 to the screw. The crank arm 16 is provided with a handle and is loosely sleeved at 20 onto a reduced extension of the shaft 17, being held in place by a nut 21. This arm 16 is adjustably connected to the shaft 17 by means of gear 24 fixed thereon which meshes with a pinion 26 carried by an arm integral with and extending diametrically opposite the arm 16. The pinion 26 is adjustable relative to the gear 24 by means of a precision adjusting device. The details of this precision adjusting device are similar to that shown in the patent to C. H. Norton No. 762,838, dated June 14, 1904. The pinion 26 is mounted for axial movement into and out of engagement with the toothed wheel 24 and for rotation to angularly adjust it on the wheel, a spring pressed plunger 27, cooperating with holes 28 in an indexing plate 29 to lock the pinion in adjusted position.

Figure 6:
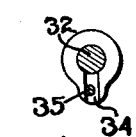
Fig. 6 is a fragmentary section on the line 6—6 of Fig. 5.
Figure 3:
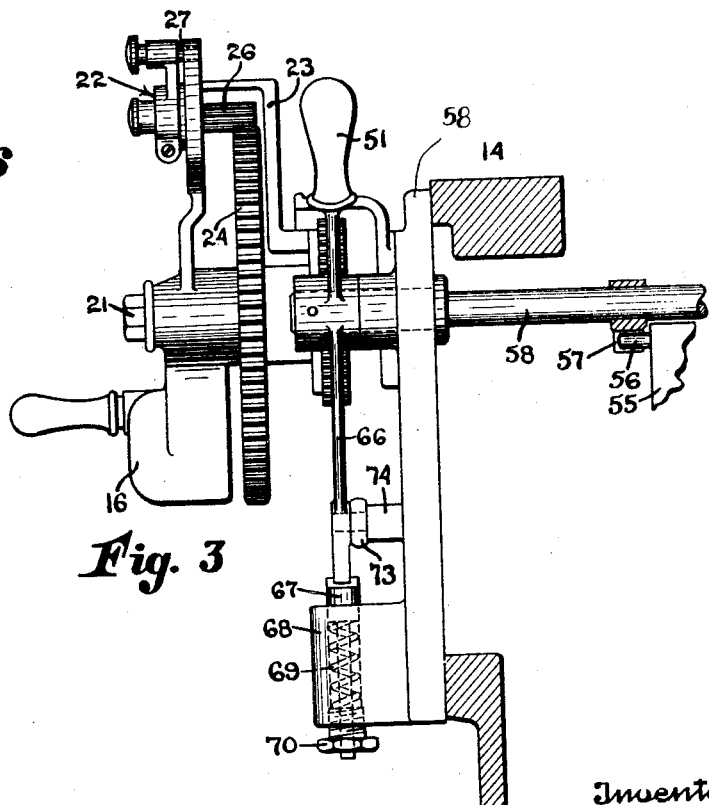
Fig. 3 is an end elevation, parts being removed and broken away.

To positively stop the cross-feed mechanism at a predetermined point, I may provide a stop lever having a relatively long arm 30 and a short arm 31, the lever being pivoted as by means of a stud, 32 (Fig. 1) to the base of the machine. This lever is adapted to have a limited movement, which is preferably determined by the width of a slot 34 in the frame, into which extends a short pin 35 connected to the lever, as shown in detail in Figs. 5 and 6. The lever is preferably held in inoperative position, as shown in Fig. 1, by means of a spring 33 and is adapted to be moved to its operative position as is clearly described and illustrated in the above-mentioned patent.

Figure 4:
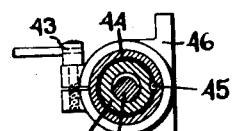
Fig. 4 is a sectional detail on the line 4—4 of Fig. 1.

The mechanism for causing the movement of the lever to its operative position, where the end of its long arm 30 lies in the path of an abutment 36 on the arm 23, consists of means active after a predetermined number of revolutions to engage the lever. This means may comprise a nut 41, arranged to travel along a screw 42 and engage the arm 31 which is forked to straddle the screw. The screw is mounted for rotation in bearing brackets 46 and 47 secured as by screws to the apron plate 58 carrying the cross feed mechanism. The end of the screw 42 is provided with a spiral pinion 37 keyed thereto, and meshing with a spiral gear 38 which is loosely mounted on the shaft 17 between a flange on the spacing sleeve 39 and a short sleeve 40 surrounding the sleeve 39. This gear is rigidly connected to the arm 23 by screws. The nut 41 is held against rotation by a tubular member 44 by the splined connection 45, this member 44 being held at its ends in suitable bearings in the brackets 46 and 47. The bearing bracket 46 is preferably split and provided with a clamping screw 43 (Fig. 4) described in the prior patent, to clamp the member 44 rigidly in adjusted position. When it is desired to move the nut 41 along the screw 42 without rotating the crank and feed screw, the clamping screw 43 is loosened and the member 44 can then be rotated. To easily effect such rotation manually, the member 44 may be provided with a knurled portion 48.

In machines of this kind it is desirable to feed the wheel into the work continuously by power and I, therefore, provide means in my cross feed mechanism to permit me to use power feed with my automatic operating mechanism. To accomplish this I may employ the mechanism illustrated in the prior patent to Norton which comprises a continuously driven shaft 50 arranged parallel to the shaft 17 and a driving connection between said shafts, which can be rendered operative or inoperative at the will of the operator, by means of a lever 51 at the front of the machine.

To render the driving connection between said shafts positively operative, I may employ any of the well known load and fire mechanisms but have shown a mechanism of the spring pressed plunger type. As shown, the driving connections between the two shafts comprise gears 52 and 53, keyed to their respective shafts and a tumbler gear 54, mounted in a bracket 55 which is pivoted to swing on the hubs of the gear 52. The gear 52 is always in mesh with the gear 54. Bracket 55 is provided with a pin 56 (Fig. 1) adapted to be engaged by a forked member 57, projecting radially from the axis of the shaft 58, to which the hand lever 51 is rigidly connected. When the lever is in the position shown in full lines in Fig. 1, the gear 54 is out of mesh with the gear 53 and the cross feed is operated manually. The shaft 50 is driven by means of a worm wheel 60 and worm 61 from the shaft 62, which is in turn driven by any suitable means such as a sprocket gear 63 and chain 64, driven from a power shaft (not shown) in the base of the machine.

To effect the automatic operation of the power feed, so as to obtain the objects of my invention, I provide an adjustable mechanism operated by the micrometer mechanism, which will positively throw the tumbler gear into mesh when the slide has reached a predetermined point to provide a power feed for further movement thereof. This is accomplished in the present embodiment by throwing the tumbler gear 54 into mesh with gear 53. I also provide means whereby these gears will be thrown out of mesh when the operator starts to rotate the feed wheel 24 in the reverse direction to remove the wheel from the work, thus permitting free manual movement of the feed mechanism. As illustrated, I have shown the lever 51 provided with a downwardly extended lever 66, which is adapted to be held either in an operative or inoperative position by means of a spring pressed plunger 67, which bears against the lower end of the lever 66. The spring pressed plunger 67 is mounted in the projection 68 and is held by means of the spring 69 in operative engagement with the V-shaped end of the lever 66, so that when the lever 66 is moved to a point slightly beyond the high point of the V, the tension of the spring 69 is released and quickly throws the lever 66, and consequently the tumbler gear 54 into or out of mesh. To permit adjustment of the tension of the spring 69, I provide an adjustable nut 70, which permits the tension to be increased or decreased as desired.

To permit the lever 66 to be thrown automatically, I provide the lever with a pin 71, engaging an elongated slot 72 at the end of the slide rod 73. The slide rod 73 is mounted to slide within the bosses 74 and 75 and is provided with a projecting arm 76, having a finger 77, adapted to be engaged by the nut 41. In order that this connection may be adjusted, so that the nut 41 will strike the finger 77, at the predetermined point to throw the tumbler gear at the proper time, I provide the slide rod 73, with a screw threaded member 78, which is mounted on a reduced portion and held in place by the nut 79. This threaded member 78 carries the projecting arm 76 and permits an adjustment thereof relative to the rod 73.

To permit the tumbler gear 54 to be thrown automatically out of engagement with the gear 53, thus disconnecting the power feed when the feed wheel 24 is turned in a clockwise direction to remove the grinding wheel from the work, I provide the arm 80, projecting from the shaft 58 and adapted to be engaged by a pin 81 on the gear 38. To permit the feed wheel 24 to be rotated in a counter-clockwise direction to feed the wheel toward the work, I provide the lever 80 with a pivoted extension 82, which is pivoted at 83 on the arm 80 and adapted to engage a stop pin 84. From this construction it will be readily apparent that when the wheel 24 is turned in a counter-clockwise direction the pin 81 will strike against the lower face of the projecting lever 82 and swing the lever upwardly as it passes by, thus permitting the feed wheel 24 to be turned any number of revolutions in a counter-clockwise direction.

In the operation of my mechanism, as the micrometer mechanism is turned manually by the operator to feed the grinding wheel toward the work, the nut 41 is moved along the screw 42 by rotation of the screw which is connected to the gear 37 until it engages the finger 77 of the arm 76 and starts to move the rod 73 toward the left. As this motion continues the V-shaped end of the lever 66 rides over the spring pressed plunger 67 until the high point of the lever 66 passes the high point of the plunger, at which point the released tension of the compressed spring 69 throws the tumbler gear 54 into engagement with the gear 53 and connects the power feed. By adjustment of the projecting arm 76, relative to the rod 73, the point at which the power feed is thrown in may be varied so that it will be thrown in at any desired point, just before the grinding wheel comes in contact with the work to be ground. This power feed continues to feed the wheel into the work until the nut 41 engages the arm 31 and moves the stop arm 30 into engagement with the abutment 36 to stop the wheel feed when the work has reached the desired size. At this point the frictional connection between the shaft 50 and worm gear 60 slips and prevents further feed of the wheel. To remove the grinding wheel from the work, the operator then turns the feed wheel 24 manually in a clockwise direction against the friction of the clutch between the shaft 50 and the gear 60 until the pin 81 engages the lever 82 and moves it downwardly to throw the tumbler gear 54 out of engagement with the gear 53, thus disengaging the power feed and permitting the operator to rapidly rotate the wheel 24 manually to remove the grinding wheel from the finished work.

I claim:

1. A cross feed mechanism comprising a cross feed screw, manually operative means to move the same, a screw operated in timed relation to the cross feed screw, a non-rotatable nut thereon moved longitudinally by rotation of the screw, a positive stop for checking the rotation of said screw, which is engaged by said nut and shifted from an inoperative to an operative position, a power driven shaft, a load and fire operated clutch mechanism to connect the power shaft with the cross feed screw, and an adjustably positioned, movable finger engageable by said nut and operatively connected with the clutch mechanism to throw the clutch.

2. A cross feed mechanism for a grinding machine comprising a cross feed screw, manually operable precision mechanism to move the same, a member movable in timed relation with the screw, means including a positive stop for checking the rotation of the screw which is engageable by said member and shifted thereby from an inoperative to an operative position, a power driven shaft, a clutch arranged to connect the shaft with the screw and means including a movable part engageable by said member to throw the clutch and cause the screw to be operated by power when the screw has been manually turned through a given distance.

3. A grinding machine comprising a grinding wheel slide, a cross feed screw connected to move the same, a manually operable micrometer mechanism to turn the screw, an adjustable stop cooperating with said mechanism which is effective to stop the slide at any predetermined point, a member movable in timed relation with the cross feed screw which is effective to move the stop to an operative position, a power feed mechanism including a friction drive and a clutch connectible to the cross feed screw, and means movable by said member in advance of its movement of the stop to throw the clutch and cause the slide to be moved solely by power after the slide has reached a predetermined position.

4. A grinding machine comprising a grinding wheel slide, a cross feed screw to move the same, manually operable mechanism to turn the screw, a stop to limit the forward movement of the screw, a member movable in timed relation with the screw, a power feed mechanism including a clutch connectible to turn the screw, connections between said member and clutch operable when the member has reached a predetermined position to throw the clutch and connect the power feed to the screw, and means effective upon turning the manually operable mechanism in the reverse direction to disconnect the clutch.

5. A grinding machine comprising a grinding wheel slide, a cross feed screw to move the same, manually operable mechanism to turn the screw, a power feed including a clutch connectible to the screw, a member movable in timed relation with the screw, connections between said member and clutch effective to connect the power feed to the screw when the slide has been moved manually to a predetermined position, and means effective upon turning the manually operable mechanism in the opposite direction which serves to disconnect the clutch.

6. A grinding machine comprising a grinding wheel slide, a cross feed screw to move the same, a hand wheel connected to turn the screw, a power feed including a clutch connectible to operate the screw, adjustable means to throw the clutch when the slide has been moved to a predetermined position and thereby connect the power feed to the screw, and means effective upon turning the hand wheel in the reverse direction to disconnect the clutch.

7. A grinding machine comprising a grinding wheel slide, a cross feed screw operatively connected to move the slide, a manually operable micrometer mechanism connected to the screw to precisely move the slide and the wheel carried thereby, an adjustable stop associated with the screw to stop the wheel slide when it has reached a predetermined position, power mechanism effective to rotate the screw, and means operating in timed relation with the slide which serves to render the power mechanism effective to turn the screw and feed the wheel forward slowly after the slide has been manually moved to a predetermined position in advance of the stopping position.

8. A grinding machine comprising a grinding wheel slide, a cross feed screw operatively connected to move the slide, a hand wheel and a micrometer mechanism associated therewith to turn the screw rapidly or with a precise movement, a power feed mechanism including a clutch connectible to the screw to move the slide forward, a member moved by the hand wheel in timed relation with the cross feed screw, connections between said member and the clutch effective to throw the clutch when the slide has reached a predetermined position and cause the power feed to move the slide thereafter, and an adjustable stop to limit the movement of the slide.

Signed at Worcester, Massachusetts, this 18th day of April, 1923.

HERBERT A. SILVEN.